(12) United States Patent
Ghatak et al.

(10) Patent No.: US 11,061,528 B1
(45) Date of Patent: Jul. 13, 2021

(54) METHOD AND SYSTEM FOR DETECTING FREE AREA IN ELECTRONIC INSTRUMENT CLUSTER FOR DISPLAYING DYNAMIC CONTENT

(71) Applicant: WIPRO LIMITED, Bangalore (IN)

(72) Inventors: Sandip Ghatak, Kolkata (IN); Nilanjan Biswas, Kolkata (IN); Shantanu Banerjee, Howrah (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/835,120

(22) Filed: Mar. 30, 2020

(30) Foreign Application Priority Data

Feb. 17, 2020 (IN) .............................. 202041006831

(51) Int. Cl.
| | |
|---|---|
| *G06F 3/0481* | (2013.01) |
| *G06F 3/14* | (2006.01) |
| *B60K 37/02* | (2006.01) |
| *B60K 35/00* | (2006.01) |

(52) U.S. Cl.
CPC ............ *G06F 3/0481* (2013.01); *B60K 35/00* (2013.01); *B60K 37/02* (2013.01); *G06F 3/14* (2013.01)

(58) Field of Classification Search
CPC ........ G06F 3/0481; B60K 35/00; B60K 37/02
See application file for complete search history.

(56) References Cited

U.S. PATENT DOCUMENTS

| | | | |
|---|---|---|---|
| 9,924,050 B2 | 3/2018 | Sugimoto | |
| 2014/0344750 A1* | 11/2014 | Takahashi | G06F 3/04886 715/790 |
| 2019/0114308 A1* | 4/2019 | Hancock | G06F 40/106 |
| 2020/0262294 A1* | 8/2020 | Gautier | B60K 37/02 |

\* cited by examiner

*Primary Examiner* — Ryan R Yang
(74) *Attorney, Agent, or Firm* — Finnegan, Henderson, Farabow, Garrett & Dunner, LLP

(57) ABSTRACT

A method and system for detecting free area in electronic instrument clusters is disclosed. The method includes determining at least one free area in an electronic instrument cluster based on static free area data and a plurality of sensor data. The method further includes generating for each of the at least one free area, a metadata including a plurality of attributes. The method includes determining for each of the at least one free area, a first hash value based on at least one attribute from the associated plurality of attributes. The method further includes creating a data structure, for each of the at least one free area, based on the associated metadata and the associated first hash value. The method includes transmitting a first packet to a dynamic content device, such that, the first packet includes the data structure.

19 Claims, 8 Drawing Sheets

US 11,061,528 B1

METHOD AND SYSTEM FOR DETECTING FREE AREA IN ELECTRONIC INSTRUMENT CLUSTER FOR DISPLAYING DYNAMIC CONTENT

TECHNICAL FIELD

This disclosure relates generally to electronic instrument clusters, and more particularly to method and system for detecting free area in electronic instrument cluster for displaying dynamic content.

BACKGROUND

Today, most of the Automotive Original Equipment Manufacturers (OEMs) are shifting from analog to electronic instrument clusters (for example, digital full Liquid Crystal Display (LCD) instrument clusters). Most of these electronic instrument clusters are of relatively large size supporting advance Graphical User Interface (GUI). Conventional electronic instrument clusters in automotive were limited to displaying critical vehicle related data only. The current generation electronic instrument clusters display much more information along with the existing vehicle data, for example, navigation turn by turn information, Advanced Driver Assistance (ADAS) information, or media information etc. With this change there comes a scope for OEM extended services, after sales team, insurance vendors and other third-party providers to provide contextual dynamic content related to vehicle performance, safety, and enhanced drive experience directly to the electronic instrument cluster.

However showing dynamic content on the electronic instrument clusters is much challenging than it sounds because of multiple reasons. The reasons may include unavailability of context aware data and limited processing and memory power to generate dynamic content on-chip inside the electronic instrument cluster, limited and predefined Human Machine Interface (HMI) (assets) capabilities of the electronic instrument cluster's stock OEM software which limits showing rich dynamic/contextual contents on the fly, relatively compact screen space of electronic instrument clusters makes it difficult to ensure that critical HMI components do not get obscured with externally received dynamic contents.

Additionally, conventional methods and systems face multiple challenges and problems, which may include: limited screen space that allows small amount of available free spaces, ever-changing native HMI contents as the vehicle is in continuous motion and vehicle alarm and sensor data keeps on changing the HMI, identifying free spaces keeping in mind the overall HMI theme, driver distraction, vehicle state, and surrounding environmental conditions. Also, there is a need to ensure clutter free, non-overlapping, and non-obscuring HMI, thus identifying free spaces has to be precise. Moreover, due to time lag (because of network lag) between computed free spaces and received dynamic contents (for those free spaces), it becomes important to ensure the integrity of the free spaces before displaying contents, because something might have changed in the electronic instrument cluster's HMI, by the time the content was received and hence previously shared free-spaces may not hold true now.

SUMMARY

In an embodiment, a method for detecting free area in electronic instrument clusters is disclosed. In one embodiment, the method includes determining, by a free area detection system, at least one free area in an electronic instrument cluster based on static free area data and a plurality of sensor data. The method further includes generating, by a free area detection system, for each of the at least one free area, a metadata comprising a plurality of attributes. The plurality of attributes for a free area include at least one of dimensions of the free area, coordinates of the free area, a color matrix associated with the free area, font attributes associated with the free area, and a visibility score associated with the free area. The method includes determining, by a free area detection system, for each of the at least one free area, a first hash value based on at least one attribute from the associated plurality of attributes. The method further includes creating, by a free area detection system, a data structure, for each of the at least one free area, based on the associated metadata and the associated first hash value. The method includes transmitting, by a free area detection system, a first packet to a dynamic content device, wherein, for each of the at least one free area, the first packet comprises the data structure, and wherein the data structure associated with each of the at least one free area is used by the dynamic content device to select a free area from the at least one free area to render a dynamic content.

In another embodiment, a free area detection system for detecting free area in electronic instrument clusters is disclosed. The free area detection system includes a processor and a memory communicatively coupled to the processor, wherein the memory stores processor instructions, which, on execution, causes the processor to determine at least one free area in an electronic instrument cluster based on static free area data and a plurality of sensor data. The processor instructions further cause the processor to generate for each of the at least one free area, a metadata comprising a plurality of attributes, wherein the plurality of attributes for a free area comprise at least one of dimensions of the free area, coordinates of the free area, a color matrix associated with the free area, font attributes associated with the free area, and a visibility score associated with the free area. The processor instructions cause the processor to determine for each of the at least one free area, a first hash value based on at least one attribute from the associated plurality of attributes. The processor instructions cause the processor to create a data structure, for each of the at least one free area, based on the associated metadata and the associated first hash value. The processor instructions further cause the processor to transmit a first packet to a dynamic content device, wherein, for each of the at least one free area, the first packet comprises the data structure, and wherein the data structure associated with each of the at least one free area is used by the dynamic content device to select a free area from the at least one free area to render a dynamic content.

In yet another embodiment, a non-transitory computer-readable storage medium is disclosed. The non-transitory computer-readable storage medium has instructions stored thereon, a set of computer-executable instructions causing a computer comprising one or more processors to perform steps comprising determining at least one free area in an electronic instrument cluster based on static free area data and a plurality of sensor data; generating for each of the at least one free area, a metadata comprising a plurality of attributes, wherein the plurality of attributes for a free area comprise at least one of dimensions of the free area, coordinates of the free area, a color matrix associated with the free area, font attributes associated with the free area, and a visibility score associated with the free area; determining for each of the at least one free area, a first hash value based on at least one attribute from the associated plurality of attributes; creating a data structure, for each of the at least one free area, based on the associated metadata and the associated first hash value; and transmitting a first packet to a dynamic content device, wherein, for each of the at least one free area, the first packet comprises the data structure, and wherein the data structure associated with each of the at least one free area is used by the dynamic content device to select a free area from the at least one free area to render a dynamic content.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
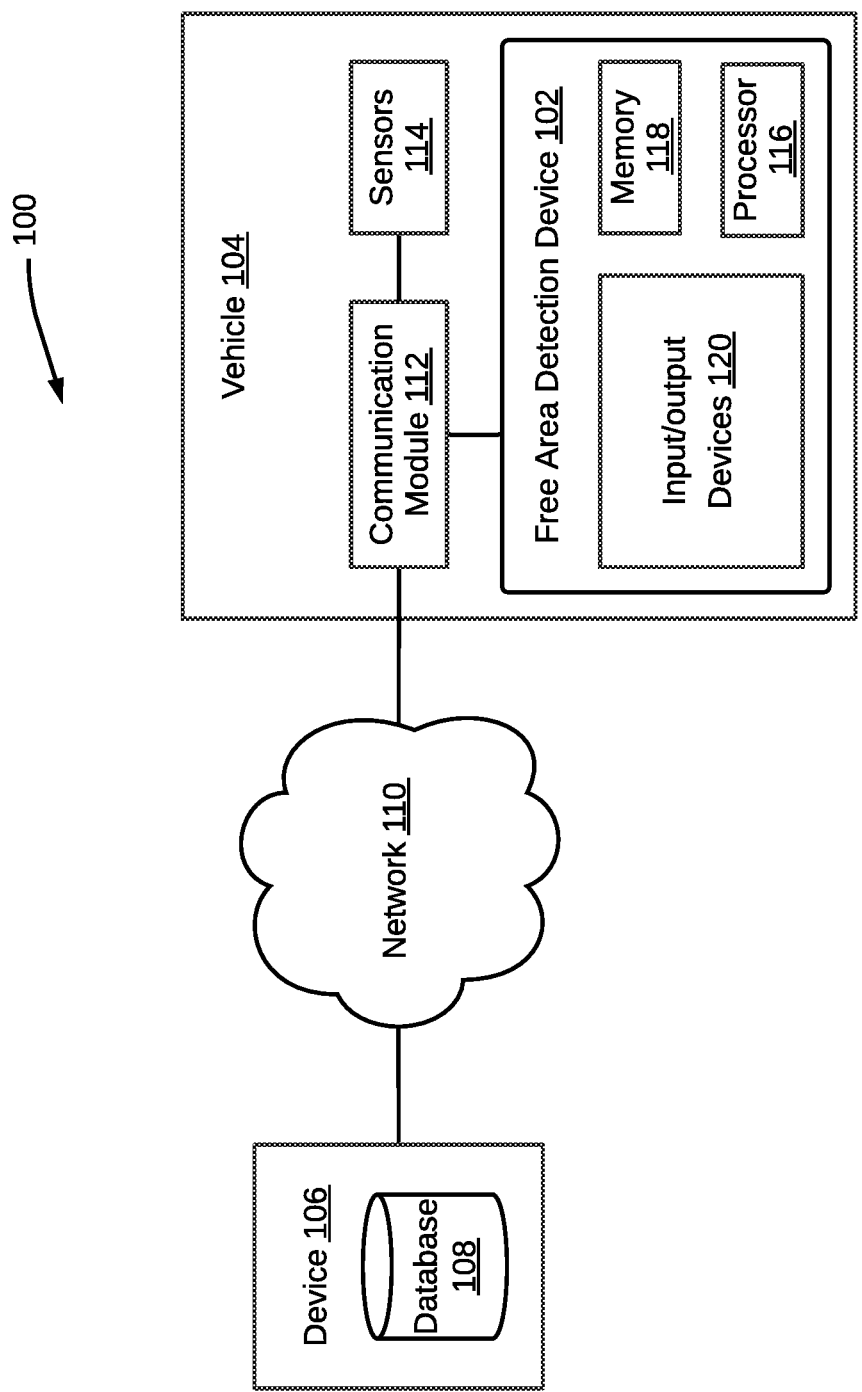
FIG. 1 is a block diagram illustrating a system for detecting free area in an electronic instrument cluster, in accordance with an embodiment.

In one embodiment, a system 100 for detecting free area in an electronic instrument cluster is illustrated in FIG. 1. The system 100 may include a free area detection system 102 that has the processing capabilities for detecting one or more free areas in an electronic instrument cluster (not shown in FIG. 1) of a vehicle 104 in order to render dynamic content. The electronic instrument cluster, for example, may be a digital or a hybrid instrument cluster. In an embodiment, the free area detection system 102 may be integrated within the electronic instrument cluster. Examples of the free area detection system 102 may include, but are not limited to an application server, a laptop, a notebook, a netbook, a tablet, a smartphone, or a mobile phone. It will be apparent to a person skilled in the art that the vehicle 104 may be an autonomous vehicle.

The one or more free areas detected by the free area detection system 102 may be used to render one or more dynamic content received from a device 106. The device 106 may be owned by a dynamic content provider. The device 106, for example, may be a laptop, a notebook, a netbook, a tablet, a smartphone, or a mobile phone. The device 106 may also be a server, for example, an Original Equipment Manufacturer (OEM) server. The one or more dynamic content, for example, may include but are not limited to advertisements (for example, offers from nearby petrol pumps, restaurants, car repair shops etc.) or external warning messages (for example, inclemental weather conditions, accidents, road blockages etc.). The device 106 may include a database 108 that may store the one or more dynamic content, which may periodically be updated by various content providers.

The vehicle 104 may be communicatively coupled to the device 106, via a network 110. The network 110 may be a wired or a wireless network and the examples may include, but are not limited to the Internet, Wireless Local Area Network (WLAN), Wireless Fidelity (Wi-Fi), Long Term Evolution (LTE), Worldwide Interoperability for Microwave Access (WiMAX), Fifth Generation (5G) network, and General Packet Radio Service (GPRS). To this end, the vehicle 104 may include a communication module 112, which may enable the vehicle 104 to transmit data to the device 106 and receive data from the device 106.

The vehicle 104 may further include one or more sensors 114 that may capture various vehicular and environmental parameters associated with the vehicle 104. Examples of the one or more sensors 114 may include, but are not limited to an Inertial Measurement Unit (IMU), a vision sensor, an ultrasonic sensor, a camera sensor, a Light Detection and Ranging (LiDAR) sensor, temperature sensor, tire pressure sensors, a Radar, an accelerometer, Advanced Driver Assistance (ADAS) sensors state, vehicle swerves, vehicle vibration sensor, or CAN bus. The parameters may include navigation parameters or health parameters of the vehicle 104. Examples of the parameters may include but are not limited to a rate of change in steering speed, acceleration and breaking time of the vehicle 104, proximity of the vehicle 104 with nearby vehicles, tire pressure, current fuel, mileage, abnormal behavior of any electronic, electrical, or mechanical system/part, ambient temperature inside the vehicle 104, and surrounding attributes associated with a navigation path of the vehicle 104.

The parameter captured by the one or more sensors 114 may be shared with the communication module 112, which may further share these parameters with the device 106, via the network 110 or with the free area detection system 102. The free area detection system 102 may use these parameters to detect one or more free area in the electronic instrument cluster of the vehicle 104. To this end, as will be described in greater detail in conjunction with FIG. 2 to FIG. 7, the free area detection system 102 may include a processor 116, which may be communicatively coupled to a memory 118. The memory 118 may store process instructions, which when executed by the processor 116 may cause the processor 116 to detect one or more free areas in the electronic instrument cluster. This is further explained in detail in conjunction with FIG. 2-FIG. 7. The memory 118 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

The free area detection system 102 may further include input/output devices 120 (for example, a touch screen display) that may be used by a user or an administrator to interact with the free area detection system 102 and vice versa. The input/output devices 120 may be used to render a result of detection of one or more free areas in the electronic instrument cluster. Additionally, the input/output devices 120 may be used to render one or more dynamic content as shared by the device 106 on the one or more free areas.

Figure 2:
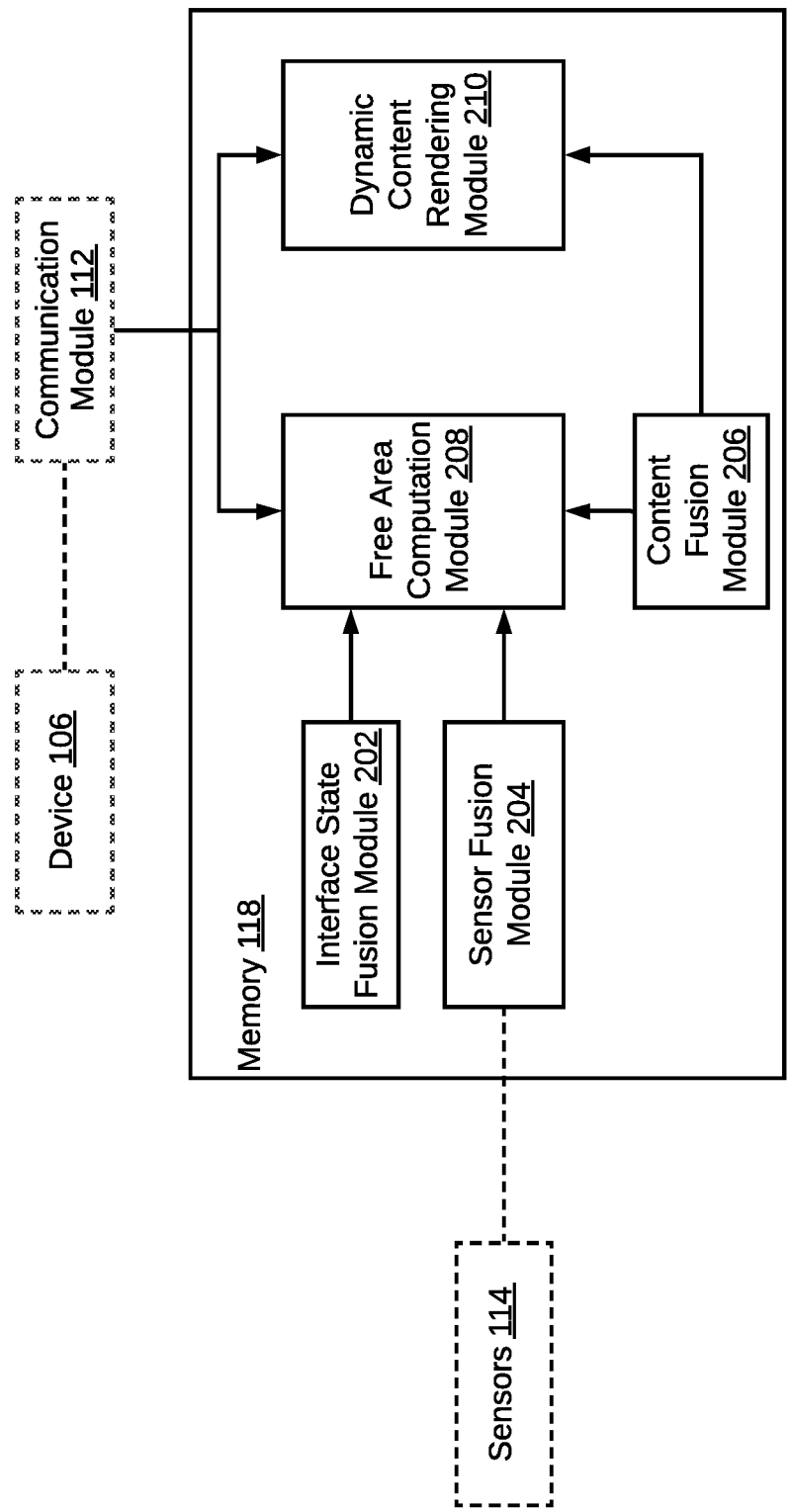
FIG. 2 illustrates a functional block diagram of various modules within a memory of a free area detection system configured to detect free area in an electronic instrument cluster, in accordance with an embodiment.

Referring now to FIG. 2, a functional block diagram of a functional block diagram of various modules within the memory 118 of the free area detection system 102 configured to detect free area in an electronic instrument cluster is illustrated, in accordance with an embodiment. As explained in conjunction with FIG. 1, the free area detection system 102 may detect one or more free areas in an electronic instrument cluster of the vehicle 104 and may then render one or more dynamic content. The memory 118 may include an interface state fusion module 202, a sensor fusion module 204, a content fusion module 206, a free area computation module 208, and a dynamic content rendering module 210.

The interface state fusion module 202 may manage the Human to Machine Interface (HMI) of the electronic instruments cluster in the vehicle 104. The interface state fusion module 202 may capture information regarding the current screen state of the electronic instrument cluster. In an embodiment, multiple static states may be stored in the memory 118. The multiple static states may correspond to multiple static pages that may displayed on the electronic instrument cluster. Examples of such static state may include, but are not limited to trip status (for example, mileage), ADAS, navigation, User Settings Menu (USM) etc. Additionally, the interface state fusion module 202 may also monitor and capture information regarding dynamic screen states. Examples of the dynamic screen states may include, but are not limited to popup HMIs, alarm icons, HMI animation states, screen illuminance, current HMI theme, current color scheme, current font definitions, and current user interactions. The interface state fusion module 202 may then synthesizes the captured information and may provide this information as input to the free area computation module 208, which may then identify and determine possible free areas in the electronic instrument cluster.

The content fusion module 206 (or an HMI pixel content fusion module) may capture color matrix information from a display buffer in the electronic instrument cluster and may provide the color matrix information to the free area computation module 208 and the dynamic content rendering module 210, both of which may use the color matrix information for the purpose of computing hash values for one or more free areas. The color matrix for a free area, for example, may be the ARGB data for the free area, where 'A' is the alpha factor, which denotes the transparency index of the free area, 'IR' is the red color component index of the free area, 'G' is the green color component index of the free area, and 'B' is the blue color component index of the free area.

The sensor fusion module 204 may receive sensor data from the one or more sensors 114 and may act as the vehicle and environmental sensor fusion module. The sensor fusion module 204 then synthesize the received sensor data and provides an input to the free area computation module 208 to determine possible free areas based on the received sensor data. The sensor fusion module 204 may also capture and share environmental data, for example, traffic congestion in current drive area, road condition, outside light, driver visibility, rain-snow, and other extreme weather conditions etc.

The free area computation module 208 may receive required set of input data from the interface state fusion module 202 and the sensor fusion unit 204 to determine one or more free areas currently available within the electronic instrument cluster. The free area computation module 208, via the communication module 112, may share information associated with one or more free areas with the device 106. the communication module 112 may also provide the free area detection system 102 with information as to the dynamic content to be rendered at the electronic instrument cluster provided by the device 106. Various modules within the free area computation module 208 are further explained in detail in conjunction with FIG. 3. In an exemplary embodiment, the one or more free areas may be determined using the equaitons 1, 2, and 3 given below:

$$\text{free\_area[ ]} = F(\text{HMI state fusion,sensor fusion}) \quad (1)$$

$$\text{HMI state fusion} = F(\text{static HMI components,visible dynamic HMI components}) \quad (2)$$

$$\text{Sensor Fusion} = F(\text{accelerometer,vehicle speed,vehicle braking,vehicle swerves,vehicle vibration sensor,CAN data,location,road quality,weather/temperature data,user interaction}) \quad (3)$$

The dynamic content rendering module 210 processes one or more dynamic contents (for example, ARGB content) received by the communication module 112 from the device 106. The dynamic content rendering module 210 may then blend the one or more dynamic content on top of an existing HMI and display the blended content on the electronic instrument cluster. Various other functionalities of the dynamic content rendering module 210 are explained in detail in conjunction with FIG. 4.

Figure 3:
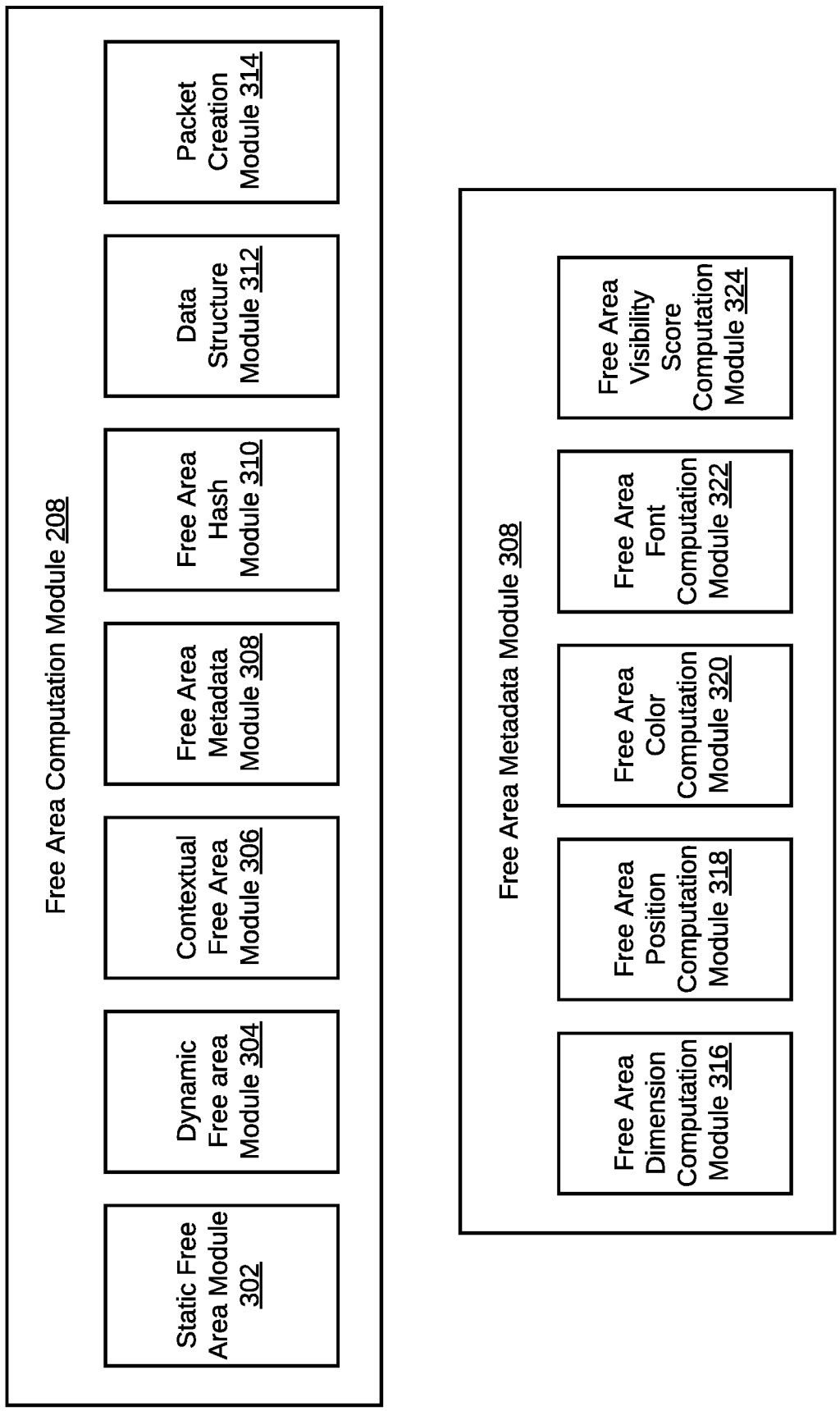
FIG. 3 illustrates a functional block diagram of various modules within a free area computation module, in accordance with an embodiment.

Referring now to FIG. 3, a functional block diagram of various modules within the free area computation module 208 is illustrated, in accordance with an embodiment. The free area computation module 208 includes a static free area module 302, a dynamic free area module 304, a contextual free area module 306, a free area metadata module 308, a free area hash module 310, a data structure module 312. And a packet creation module 314. The static free area module 302 may receive a tab information for the electronic instrument cluster from the interface state fusion module 202. The static free area module 302 may then determine one or more static free areas information as per the current tab or screen that is active of on the electronic instrument cluster. The one or more static free areas may be determined based on the current and possible contents in a particular state of the electronic instrument cluster. The output, i.e., the one or more static free areas may be passed onto the dynamic free area module 304, which may then filter non-relevant static free areas from the one or more static free areas, based on the current dynamic parameters of the electronic instrument cluster. The dynamic free area module 304 may filter the non-relevant static free areas to generate one or more dynamic free areas, based one or more of, but not limited to vehicle alarm condition, popups, high speed, high CPU usage, or active ADAS warning conditions. This is further explained in detail in conjunction with FIG. 6.

The contextual free area module 306 filters the one or more dynamic free areas received from the dynamic free area module 304 to generate one or more contextual free areas, based on environmental conditions, such as, but not limited to external weather/temperature, ongoing user interaction, bad road condition, ongoing telephone call in handsfree mode, or moving through heavy traffic. Once the one or more contextual free areas are determined, the free area metadata module 308 may generate metadata for each of the one or more contextual free areas.

To this end, the free area metadata module 308 may include a free area dimension computation module 316 that may determine dimensions (i.e., width (x) height) of each of the one or more contextual free areas. A free area position computation module 318 may compute coordinates (x,y) of each of the one or more contextual free areas on the electronic instrument cluster. A free area color computation module 320 may compute the predominant color matrix for each of the one or more contextual free areas and the associated surrounding space. The output of the free area color computation module 320 module may be a "color hex #xxxxxx" for each of the one or more contextual free areas and may represent the associated dominant color composition and may be denoted by predominantcolorhex.

For each of the one or more contextual free areas, a free area font computation module 322 may compute font attributes of all surrounding text elements. The font attributes may include, but are not limited to typeface, size, color, or style. Font data may thus be represented using the equation 4 given below:

$$\text{font\_data} = F(\text{typeface}, \text{size}, \text{color}, \text{style}) \quad (4)$$

A free area visibility score computation module 324 may compute free area visibility score for each of the one or more contextual free areas. The visibility score, for example, may be computed as a rating of 1-10, such that, 1 represents minimum visibility and 10 represents maximum visibility. When multiple contextual free areas are identified for a contextual dynamic content, visibility score is generated for each such contextual free area. By way of an example, the visibility score for a central free area may be higher than a free area located at corners of the electronic instrument cluster. In an exemplary embodiment, for a given contextual free area, visibility score may be determined using the equation 5 given below:

$$\text{free\_area\_visibility} = F(x, y, w, h) \quad (5)$$

where,
x=x co-ordinate of the free area from the top-left corner of a screen,
y=y co-ordinate of the free area from the top-left corner of the screen,
w=width of the free area,
h=height of the free area.

Once metadata for each for each of the one or more contextual free areas has been determined, the free area hash module 310 determines a unique first hash for each of the one or more contextual free areas. For a given free area, the unique hash value may be generated using pixel contents of the free area. It may be noted that the first hash value for a given free area may change, if content of the free area change even by 1 pixel. In an exemplary embodiment, first hash value for a free area may be determined using the equation 6 given below:

$$\text{first\_free\_area\_hash\_value} = F(a, r, g, b, x, y, w, h, \text{font\_data}) \quad (6)$$

The data structure module 312 may create a data structure that may uniquely represent each of the one or more contextual free areas. The data structure, for example, may be a JSON formatted data structure. The data structure for each of the one or more contextual free areas may be embedded in a packet data. The packet data may then be transmitted to external content providers. In an exemplary embodiment, data structure for each contextual free area may be represented using equation 7 given below:

$$\text{free\_area[ ]} = F(w, h, x, y, \text{predominantcolorhex}, \text{font\_data}, \text{free\_area\_visibility}, \text{first\_free\_area\_hash\_value}) \quad (7)$$

The packet creation module 314 may structure the one or more contextual free areas, along with their respective metadata, and first hash values in a JSON format. The packet creation module 314 may then create an encrypted payload (packet), which may be transmitted over the network 110 to the device 106 (or external content provider systems). In an exemplary embodiment, the packet may be represented by equation 8 given below:

$$\text{Packet} = F(\text{free\_area[ ]}) \quad (8)$$

Figure 4:
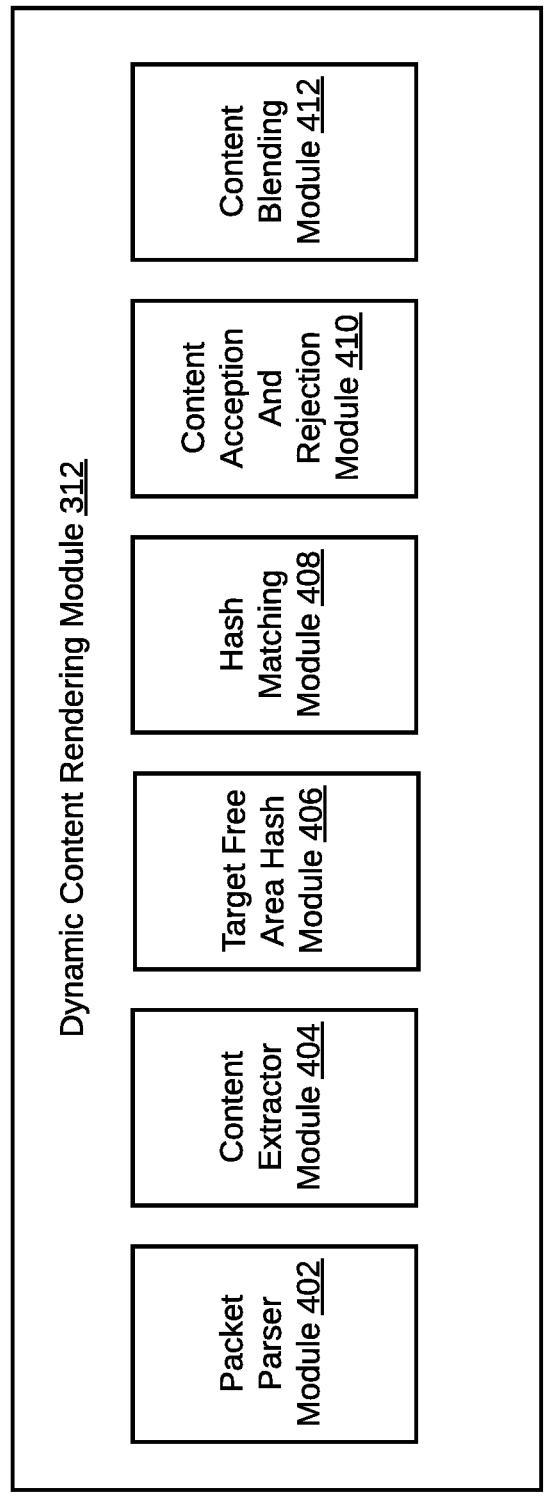
FIG. 4 illustrates a functional block diagram of various modules within a dynamic content rendering module, in accordance with an embodiment.

Referring now to FIG. 4, a functional block diagram of various modules within the dynamic content rendering module 210 is illustrated, in accordance with an embodiment. The dynamic content rendering module 210 may include a packet parser module 402, a content extractor module 404, a target free area hash module 406, a hash matching module 408, a content acception and rejection module 410, and a content blending module 412.

The packet parser module 402 may parse a packet received from the device 106 and may then decrypt the payload in the packet. The content extractor module 404 may extract externally generated dynamic content (ARGB content), a target free area metadata, and a first hash value for the target free area from the payload. In an exemplary embodiment, the received dynamic content may be represented by equation 9 given below:

$$\text{received\_content} = F(\text{argb\_content\_bytes}, \text{free\_area\_meta\_data}) \quad (9)$$

The target free area hash module 406 may re-compute hash for a target free area as in the electronic instrument cluster right now. The target free area may be identified based on the free area metadata extracted from the payload. The target free area hash module 406 may also extract co-ordinates (x, y), dimensions (w (x) h), and font data from the payload. Based on the extracted co-ordinates and the dimensions, the target free area hash module 406 may then get the color matrix (or the ARGB values) of pixels in that region from the electronic instrument cluster screen. The target free area hash module 406 may then compute a second hash value based on the color matrix, the co-ordinates, and the dimensions. The second hash value (for the target free area) may be determined using the equation 10 given below:

$$\text{second\_free\_area\_hash} = F(a, r, g, b, x, y, w, h, \text{font\_data}) \quad (10)$$

where,
a=alpha factor, which denotes the current transparency index of the target free area, r=current red color component index of the target free area,
g=current green color component index of the target free area,
b=current blue color component index of the target free area,
x=x co-ordinate from the top-left corner of the electronic instrument cluster as received from the external provider for showing dynamic content,
y=y co-ordinate from the top-left corner of the electronic instrument cluster as received from the external provider for showing dynamic content,
w=width of the dynamic content as received from the external provider,
h=height of the dynamic content as received from the external provider,
font_data=F (typeface,color,size,style).

The hash matching module 408 may compare the first hash value extracted from the payload with the freshly calculated second hash value for the target area and may determine a hash match score or a similarity score. In an exemplary embodiment, the hash match score may be in the range 0 to 1. Thereafter, the content acception and rejection module 410 may compare the similarity score (the hash match score) with a predefined similarity threshold. If the similarity score is greater than or equal to the predefined similarity threshold, the content acception and rejection module 410 may allow the dynamic content to be displayed. However, if the similarity score is less than the predefined similarity threshold, the content acception and rejection module 410 may reject the request to display the dynamic content. By way of an example, the similarity scores may be between 0 and 1, and the predefined similarity threshold may be fixed at 0.8. Thus, in this case, if the similarity score is greater than or equal to 0.8, the dynamic content is displayed, else, the request to display the dynamic content is rejected.

The content blending module 412 may blend the received dynamic content (ARGB content) on top of an existing electronic instrument cluster HMI content. The content blending module 412 may create a merged blended screen buffer, which may be displayed by a display driver during the next refresh cycle of the electronic instrument cluster.

Figure 5:
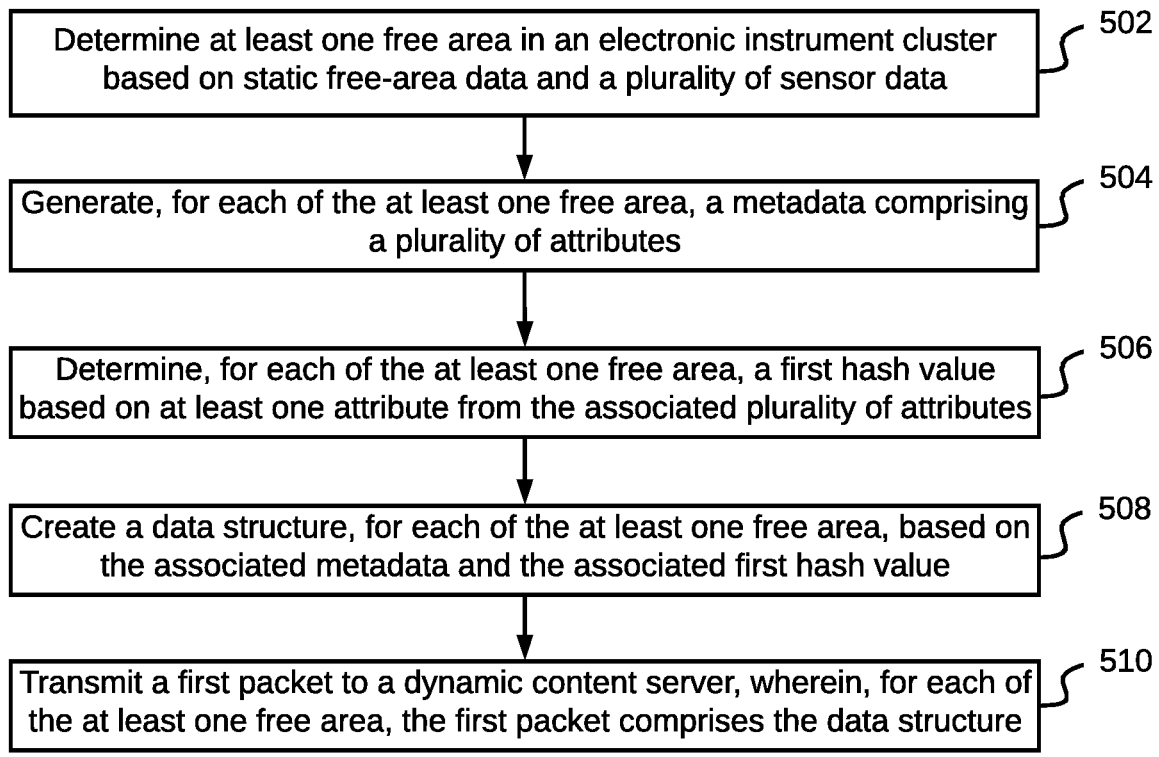
FIG. 5 illustrates a flowchart of a method for detecting free area for rendering dynamic content in an electronic instrument cluster, in accordance with an embodiment.

Referring to FIG. 5, a flowchart of a method for detecting free area for rendering dynamic content in an electronic instrument cluster is illustrated, in accordance with an embodiment. At step 502, the free area detection system 102 determines one or more free areas in the electronic instrument cluster based on static free area data and a plurality of sensor data. The static free area data has already been explained in detail in conjunction with FIG. 2 and FIG. 3. The static free area data may be derived based on multiple static states that may correspond to multiple static pages displayed on the electronic instrument cluster. Examples of such static state may include, but are not limited to trip status (for example, mileage), ADAS, navigation, USM etc. The plurality of sensor data may be derived from the one or more sensors 114, for example, and from any other external system. The plurality of sensor data may correspond to information regarding dynamic screen states. Examples of the dynamic screen states may include, but are not limited to popup HMIs, alarm icons, HMI animation states, screen illuminance, current HMI theme, current color scheme, current font definitions, and current user interactions. The method to determine the one or more free areas is further explained in detail in conjunction with FIG. 6.

For each of the one or more free areas, the free area detection system 102, at step 504, may generate a metadata that includes a plurality of attributes. For a given free area, the plurality of attributes may include one or more of one or more dimensions of the free area (for example, (w (x) h), coordinates of the free area (for example, x, y coordinates), a color matrix associated with the free area, font attributes associated with the free area, and a visibility score associated with the free area. The plurality of attributes have already been explained in detail in conjunction with FIG. 2 to FIG. 4.

Thereafter, at step 506, for each of the one or more free areas, the free area detection system 102 may determine a first hash value based on one or more attributes from the associated plurality of attributes. The determination of first hash value has already been explained in detail in conjunction with FIG. 3. At step 508, the free area detection system 102 may create a data structure for each of the one or more free areas. The data structure may be created based on the associated metadata and the associated first hash value. The creation of data structure has already been explained in detail in conjunction with FIG. 3.

At step 510, the free area detection system 102 may transmit a first packet to a dynamic content device (for example, the device 106). For each of the one or more free areas, the first packet may include the data structure. The data structure associated with each of the one or more free areas may be used by the dynamic content device to select a free area from the one or more free areas to render a dynamic content. In other words, the dynamic content device may select one of the free areas from multiple free areas, such that, the free area is best suitable for displaying a particular dynamic content. This has already been explained in detail in conjunction with FIG. 4.

Figure 6:
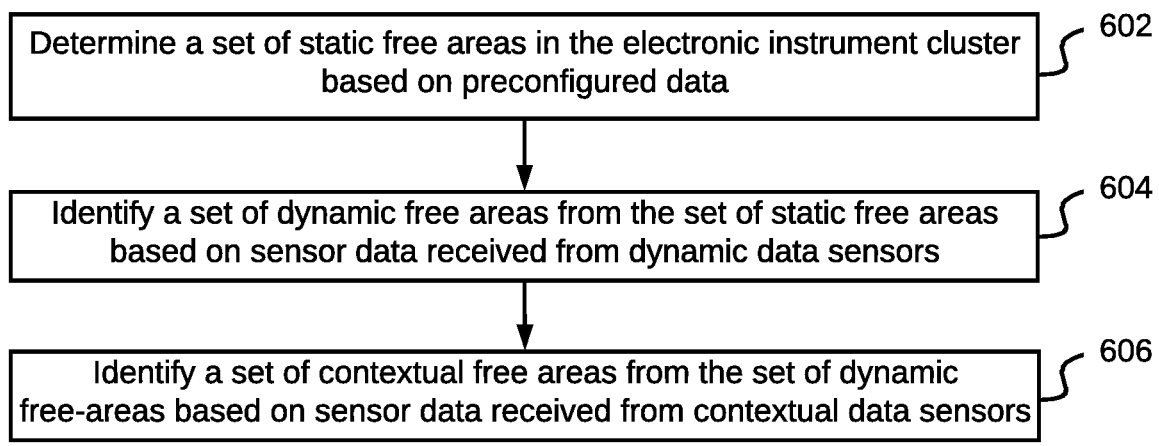
FIG. 6 illustrates a flowchart of a method for determining one or more free areas in an electronic instrument cluster, in accordance with an embodiment.

Referring now to FIG. 6, a flowchart of a method for determining one or more free areas in an electronic instrument cluster is illustrated, in accordance with an embodiment. In order to determine the one or more free areas, at step 602, a set of static free areas in the electronic instrument cluster is determined based on preconfigured data. At step 604, a set of dynamic free areas are identified from the set of static free areas based on sensor data received from dynamic data sensors. At step 606, a set of contextual free areas is identified from the set of dynamic free areas based on sensor data received from contextual data sensors. The one or more sensors 114 may include the dynamic data sensors and the contextual data sensors. It may be note that that in addition to the one or more sensors 114, external systems may also provide data used for determining the set of contextual free areas. The set of contextual free areas is the one or more free areas determined at step 502. In other words, the steps 504 to 510 may be performed on the set of contextual free areas. This has already been explained in detail in conjunction with explanation of the free area metadata module 308 in the FIG. 3.

Figure 7:
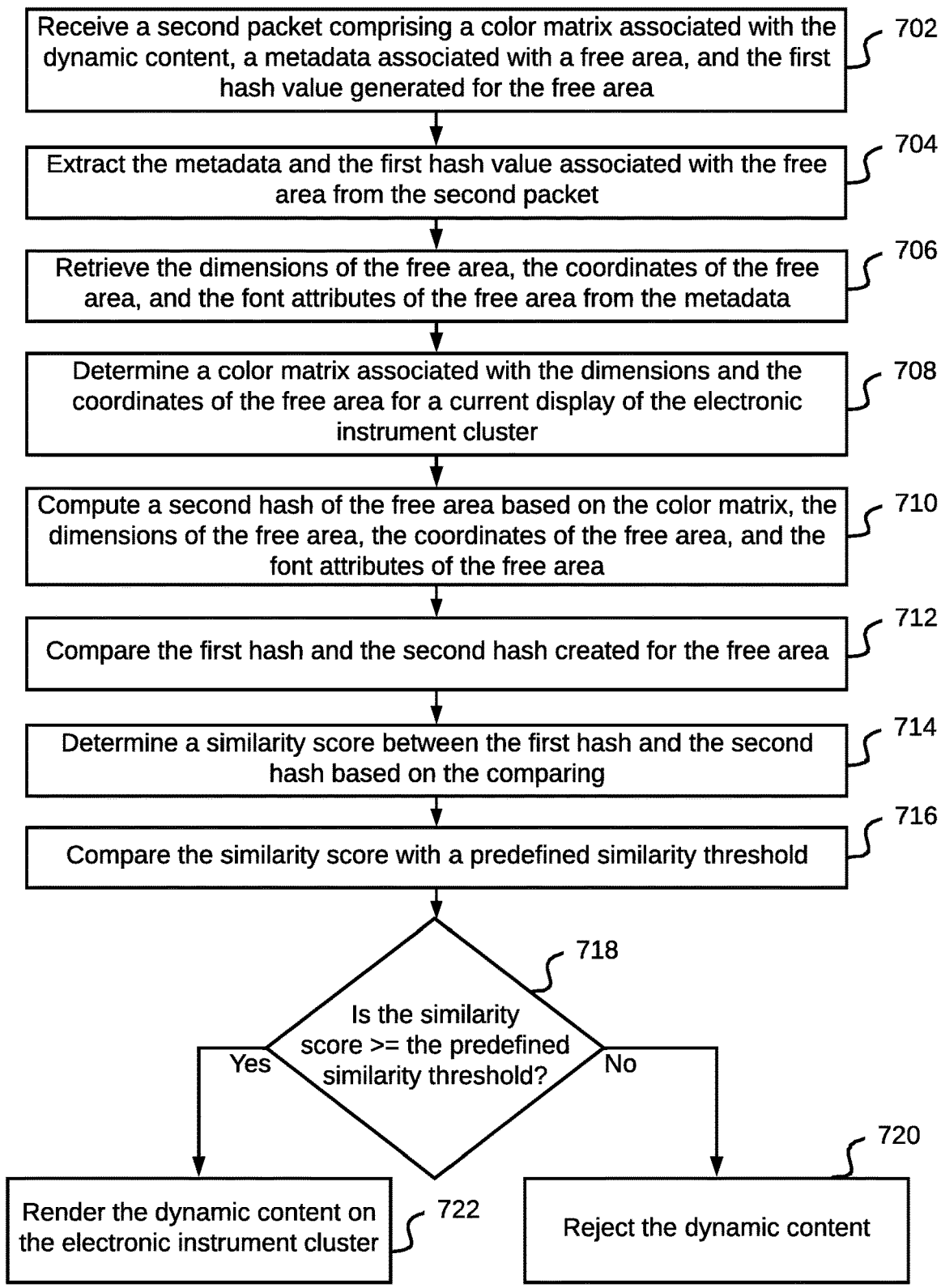
FIG. 7 illustrates a flowchart of a method for receiving a second packet including dynamic content and subsequently rendering or rejecting the dynamic content, in accordance with an embodiment.

Referring now to FIG. 7, a flowchart of a method for receiving a second packet including dynamic content and subsequently rendering or rejecting the dynamic content is illustrated, in accordance with an embodiment. After a dynamic content device identifies a free area that may be used to render a dynamic content, the second packet is received from the dynamic content device at step 702. The second packet includes a color matrix associated with the dynamic content, a metadata associated with the free area, and the first hash value generated for the free area. This has already been explained in detail in conjunction with FIG. 4.

At step 704, the metadata and the first hash value associated with the free area are extracted from the second packet. At step 706, the dimensions of the free area, the coordinates of the free area, and the font attributes of the free area are retrieved from the metadata. At step 708, a color matrix associated with the dimensions and the coordinates of the free area (or the target free area) for a current display of the electronic instrument cluster are determined. At step 710, a second hash of the free area is computed based on the color matrix, the dimensions of the free area, the coordinates of the free area, and the font attributes of the free area. This has already been explained in detail in conjunction with FIG. 4.

At step 712, the first hash and the second hash created for the free area are compared. At step 714, a similarity score between the first hash and the second hash is determined based on the comparing. At step 716, the similarity score is compared with a predefined similarity threshold. At step 718, a check is performed to determine whether the similarity score is greater than or equal to the predefined similarity threshold. If the similarity score is less than the predefined similarity threshold, the dynamic content is rejected at step 720. In an embodiment, a Negative Acknowledgement (NACK) may be sent to the dynamic content device, indicating that that the request has been turned down. Referring back to the step 718, if the similarity score is greater than or equal to the predefined similarity threshold, the dynamic content is rendered on the electronic instrument cluster, at step 722. This has already been explained in detail in conjunction with FIG. 4. Post displaying the dynamic content, an Acknowledgement (ACK) is sent to a the dynamic content device indicating that the request has been acknowledged.

Figure 8:
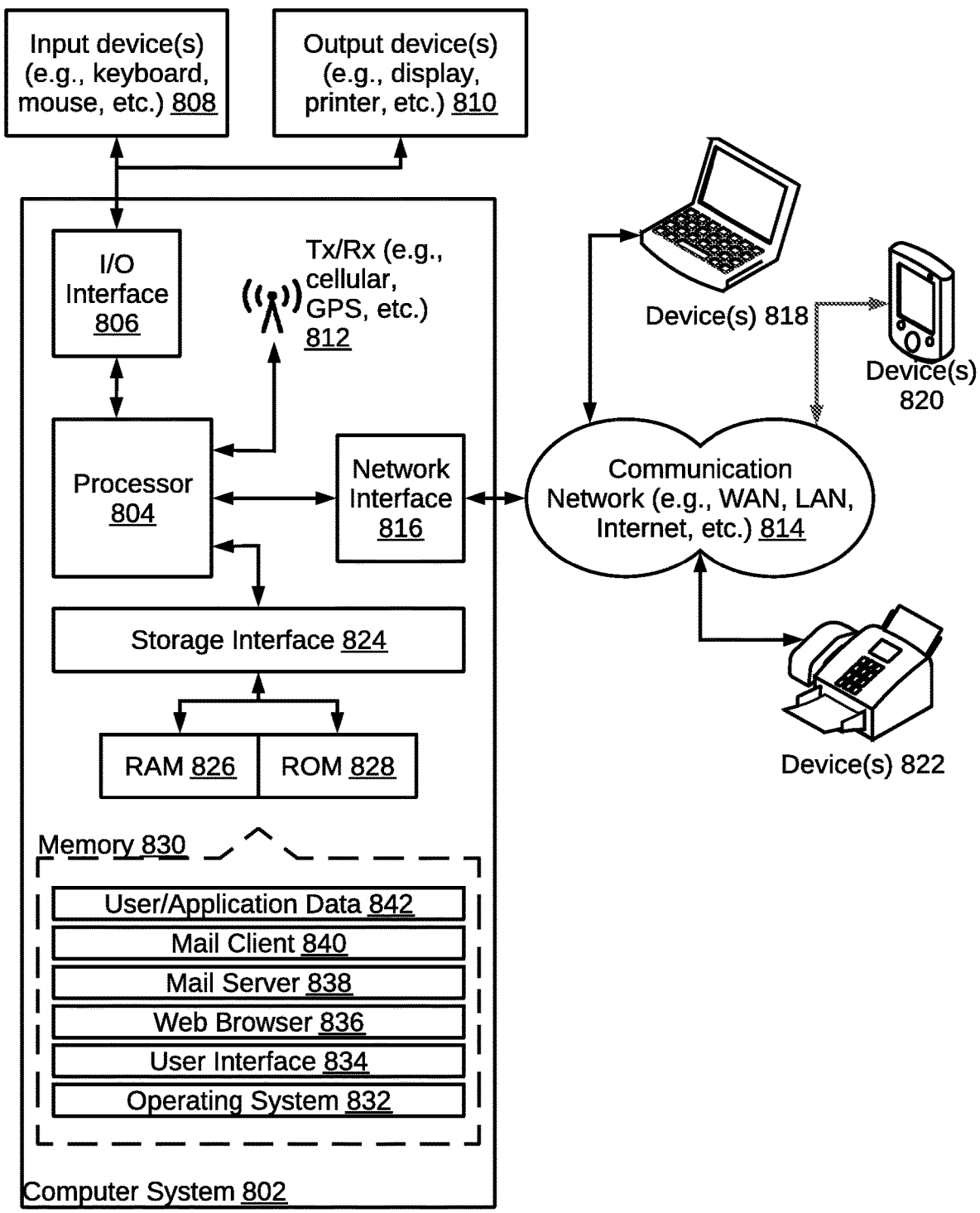
FIG. 8 illustrates a block diagram of an exemplary computer system for implementing embodiments consistent with the present disclosure.

Referring now to FIG. 8, a block diagram of an exemplary computer system 802 for implementing various embodiments is illustrated. Computer system 802 may include a central processing unit ("CPU" or "processor") 804. Processor 804 may include at least one data processor for executing program components for executing user or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 810 may be a printer, fax machine, video display (for example, cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (for example, using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 802 may itself embody one or more of these devices.

In some embodiments, processor 804 may be disposed in communication with one or more memory devices (for example, RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 830 may store a collection of program or database components, including, without limitation, an operating system 832, user interface application 834, web browser 836, mail server 838, mail client 840, user/application data 842 (for example, any data variables or data records discussed in this disclosure), etc. Operating system 832 may facilitate resource management and operation of computer system 802. Examples of operating systems 832 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 802 may implement a web browser 836 stored program component. Web browser 836 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 802 may implement a mail server 838 stored program component. Mail server 838 may be an Internet mail server such as MICROSOFT® EXCHANGE® mail server, or the like. Mail server 838 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement a mail client 840 stored program component. Mail client 840 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for detecting free area in electronic instrument cluster for displaying dynamic content. The proposed method solves the problem of displaying dynamic content from an external system in an electronic instrument cluster in a safe and secure manner based on the available free space in the electronic instrument cluster and the vehicle and environmental states.

The specification has described method and device for detecting free area in electronic instrument cluster for displaying dynamic content. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting free area in electronic instrument clusters, the method comprises:
   determining, by a free area detection system, at least one free area in an electronic instrument cluster based on static free area data and a plurality of sensor data;
   generating, by the free area detection system, for each of the at least one free area, a metadata comprising a plurality of attributes, wherein the plurality of attributes for a free area comprise at least one of dimensions of the free area, coordinates of the free area, a color matrix associated with the free area, font attributes associated with the free area, and a visibility score associated with the free area;
   determining, by the free area detection system, for each of the at least one free area, a first hash value based on at least one attribute from the associated plurality of attributes;
   creating, by the free area detection system, a data structure, for each of the at least one free area, based on the associated metadata and the associated first hash value; and
   transmitting, by the free area detection system, a first packet to a dynamic content device, wherein, for each of the at least one free area, the first packet comprises the data structure, and wherein the data structure associated with each of the at least one free area is used by the dynamic content device to select a free area from the at least one free area to render a dynamic content.

2. The method of claim 1, wherein determining the at least one free area comprises:
   determining a set of static free areas in the electronic instrument cluster based on preconfigured data;
   identifying a set of dynamic free areas from the set of static free areas based on sensor data received from dynamic data sensors;
   identifying a set of contextual free areas from the set of dynamic free areas based on sensor data received from contextual data sensors, wherein the set of contextual free areas is the at least one free area.

3. The method of claim 1, wherein the visibility score for the free area is determined based on the dimensions and coordinates of the free area.

4. The method of claim 1 further comprising receiving, from the dynamic content device, a second packet comprising a color matrix associated with the dynamic content, a metadata associated with the free area, and the first hash value generated for the free area.

5. The method of claim 4 further comprising:
   extracting the metadata and the first hash value associated with the free area from the second packet;
   retrieving the dimensions of the free area, the coordinates of the free area, and the font attributes of the free area from the metadata; and
   determining a color matrix associated with the dimensions and the coordinates of the free area for a current display of the electronic instrument cluster.

6. The method of claim 5 further comprising computing a second hash of the free area based on the color matrix, the dimensions of the free area, the coordinates of the free area, and the font attributes of the free area.

7. The method of claim 6 further comprising:
   comparing the first hash and the second hash created for the free area;
   determining a similarity score between the first hash and the second hash based on the comparing; and
   comparing the similarity score with a predefined similarity threshold.

8. The method of claim 7 further comprising rendering the dynamic content on the electronic instrument cluster when the similarity score is greater than or equal to the predefined similarity threshold.

9. The method of claim 7 further comprising rejecting the dynamic content when the similarity score is less than the predefined similarity threshold.

10. A free area detection system for detecting free area in electronic instrument clusters, the free area detection system comprises:
    a processor;
    a memory communicatively coupled to the processor, wherein the memory stores processor instruction which when executed by the processor cause the processor to:
    determine at least one free area in an electronic instrument cluster based on static free area data and a plurality of sensor data;
    generate for each of the at least one free area, a metadata comprising a plurality of attributes, wherein the plurality of attributes for a free area comprise at least one of dimensions of the free area, coordinates of the free area, a color matrix associated with the free area, font attributes associated with the free area, and a visibility score associated with the free area;
    determine for each of the at least one free area, a first hash value based on at least one attribute from the associated plurality of attributes;
    create a data structure, for each of the at least one free area, based on the associated metadata and the associated first hash value; and
    transmit a first packet to a dynamic content device, wherein, for each of the at least one free area, the first packet comprises the data structure, and wherein the data structure associated with each of the at least one free area is used by the dynamic content device to select a free area from the at least one free area to render a dynamic content.

11. The free area detection system of claim 10, wherein to determine the at least one free area, the processor instructions further cause the processor to:
    determine a set of static free areas in the electronic instrument cluster based on preconfigured data;
    identify a set of dynamic free areas from the set of static free areas based on sensor data received from dynamic data sensors;
    identify a set of contextual free areas from the set of dynamic free areas based on sensor data received from contextual data sensors, wherein the set of contextual free areas is the at least one free area.

12. The free area detection system of claim 10, wherein the visibility score for the free area is determined based on the dimensions and coordinates of the free area.

13. The free area detection system of claim 10, wherein the processor instructions further cause the processor to receive, from the dynamic content device, a second packet comprising a color matrix associated with the dynamic content, a metadata associated with the free area, and the first hash value generated for the free area.

14. The free area detection system of claim 13, wherein the processor instructions further cause the processor to:
    extract the metadata and the first hash value associated with the free area from the second packet;
    retrieve the dimensions of the free area, the coordinates of the free area, and the font attributes of the free area from the metadata; and
    determine a color matrix associated with the dimensions and the coordinates of the free area for a current display of the electronic instrument cluster.

15. The free area detection system of claim 14, wherein the processor instructions further cause the processor to compute a second hash of the free area based on the color matrix, the dimensions of the free area, the coordinates of the free area, and the font attributes of the free area.

16. The free area detection system of claim 15, wherein the processor instructions further cause the processor to:
    compare the first hash and the second hash created for the free area;
    determine a similarity score between the first hash and the second hash based on the comparing; and
    compare the similarity score with a predefined similarity threshold.

17. The free area detection system of claim 16, wherein the processor instructions further cause the processor to render the dynamic content on the electronic instrument cluster when the similarity score is greater than or equal to the predefined similarity threshold.

18. The free area detection system of claim 16, wherein the processor instructions further cause the processor to reject the dynamic content when the similarity score is less than the predefined similarity threshold.

19. A non-transitory computer-readable storage medium having stored thereon, a set of computer-executable instructions causing a computer comprising one or more processors to perform steps comprising:
    determining at least one free area in an electronic instrument cluster based on static free area data and a plurality of sensor data;
    generating for each of the at least one free area, a metadata comprising a plurality of attributes, wherein the plurality of attributes for a free area comprise at least one of dimensions of the free area, coordinates of the free area, a color matrix associated with the free area, font attributes associated with the free area, and a visibility score associated with the free area;
    determining for each of the at least one free area, a first hash value based on at least one attribute from the associated plurality of attributes;
    creating a data structure, for each of the at least one free area, based on the associated metadata and the associated first hash value; and
    transmitting a first packet to a dynamic content device, wherein, for each of the at least one free area, the first packet comprises the data structure, and wherein the data structure associated with each of the at least one free area is used by the dynamic content device to select a free area from the at least one free area to render a dynamic content.

* * * * *